W. A. LORENZ.
TYPE DISTRIBUTING MACHINE.
No. 174,915. Patented March 21, 1876.
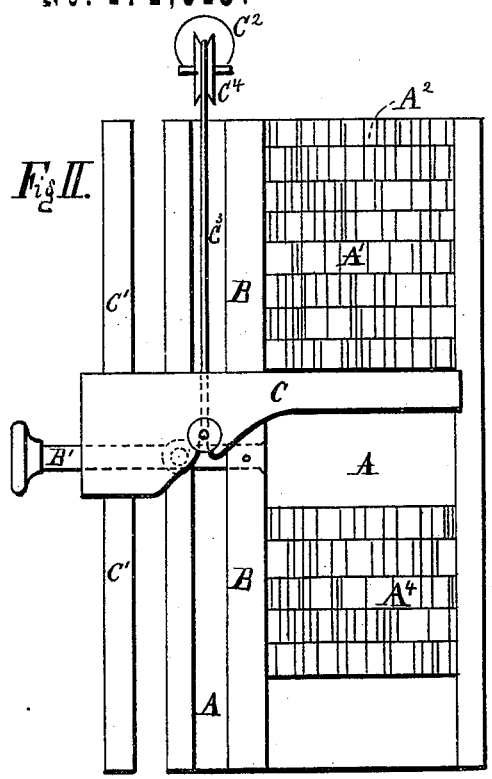
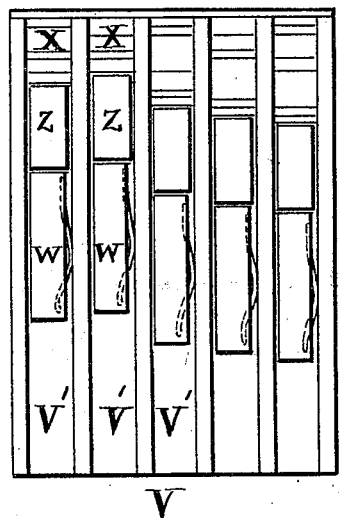
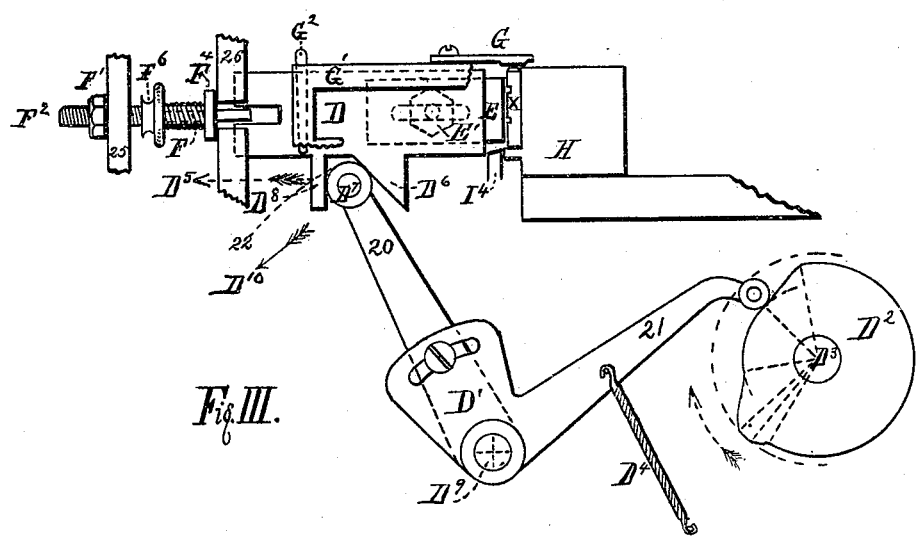

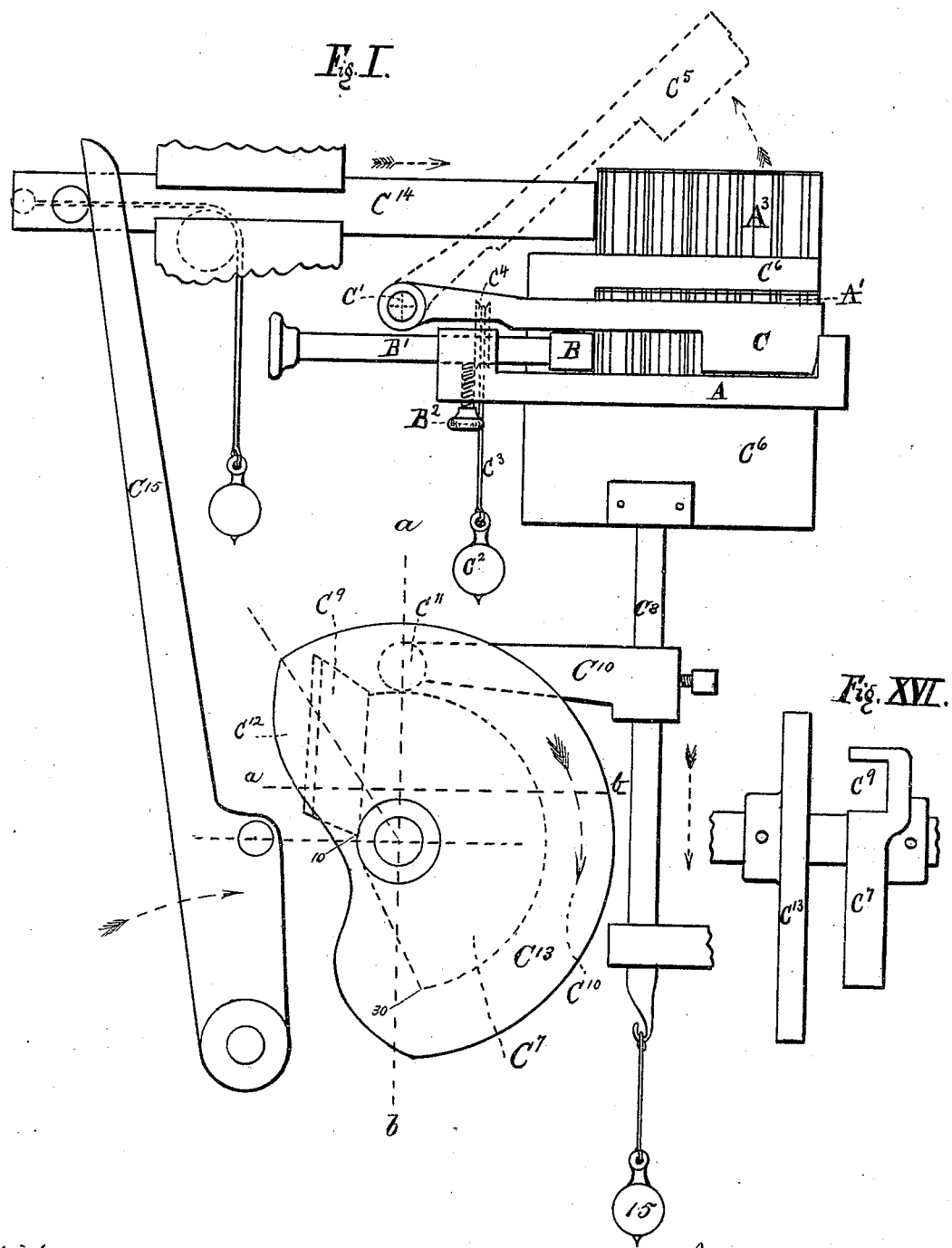

W. A. LORENZ.
TYPE DISTRIBUTING MACHINE.
No. 174,915. Patented March 21, 1876.
5 Sheets—Sheet 3.
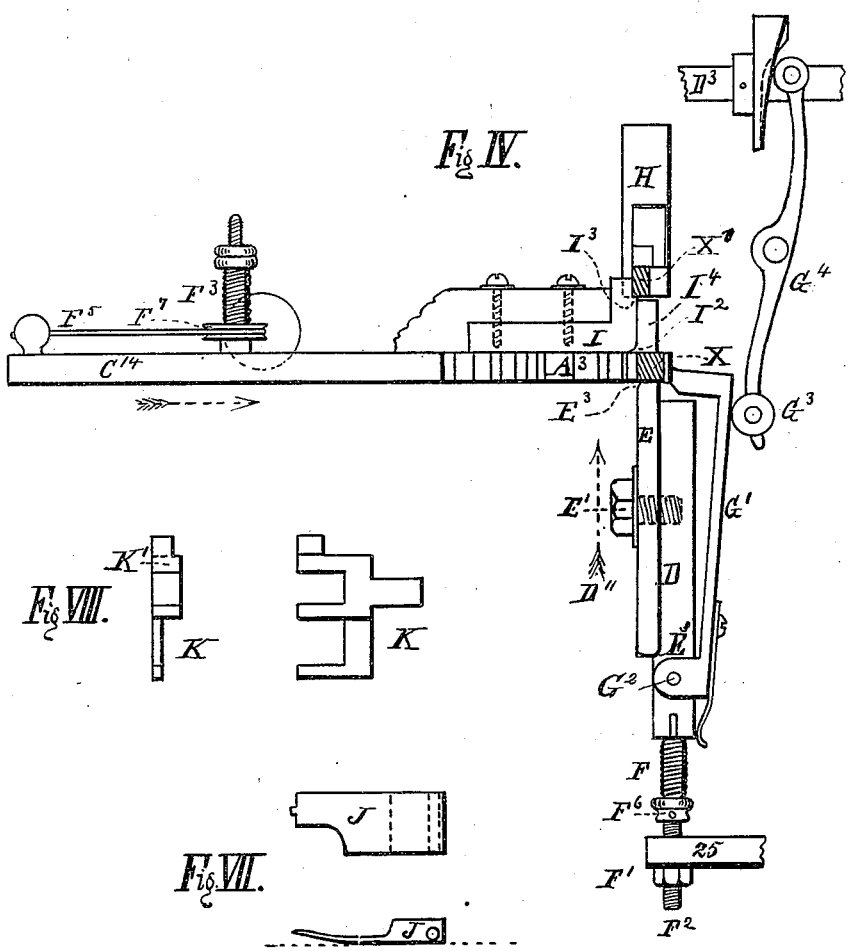
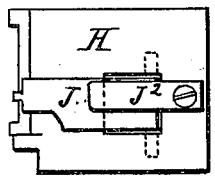
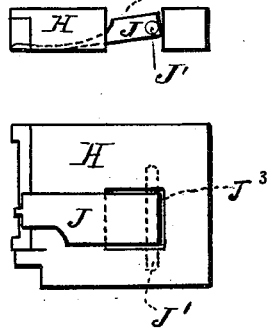
Witnesses,
John McCrone
Geo. H. Evans
Inventor
William A. Lorenz.

5 Sheets—Sheet 4.
W. A. LORENZ.
TYPE DISTRIBUTING MACHINE.
No. 174,915. Patented March 21, 1876.
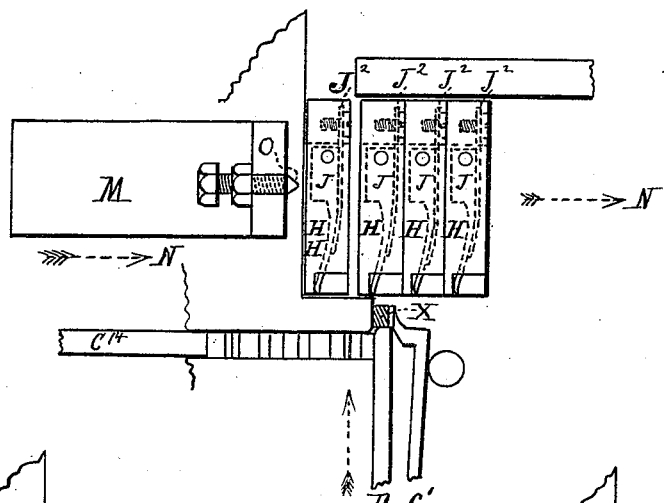
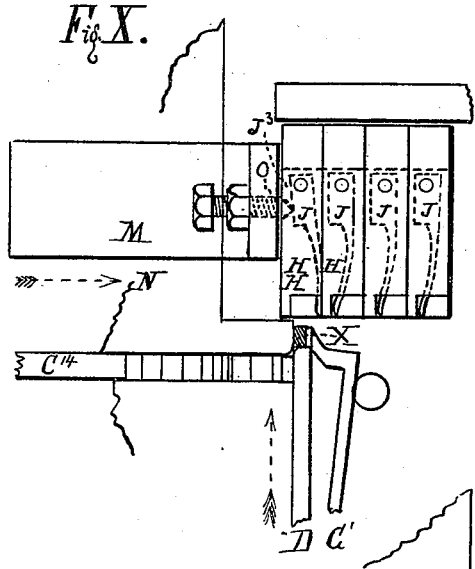
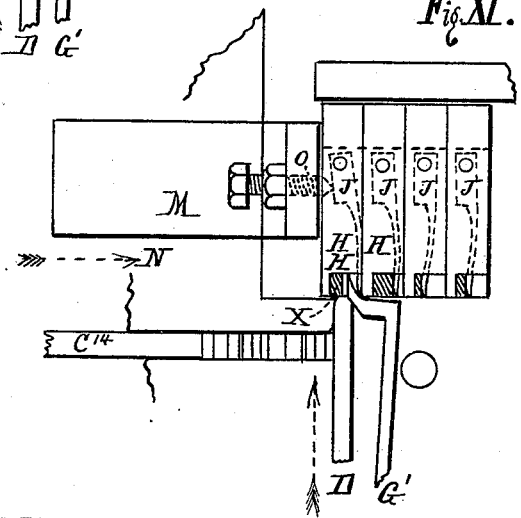
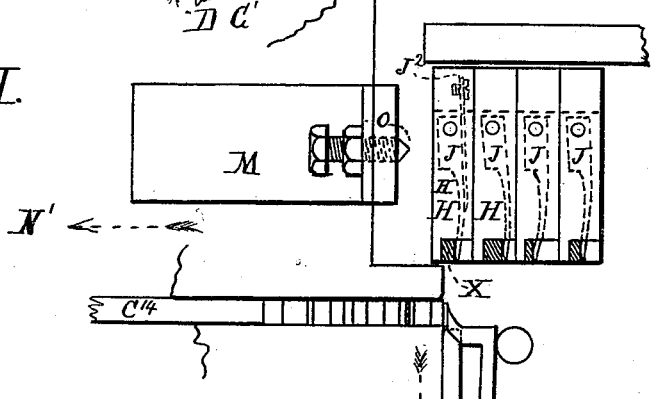

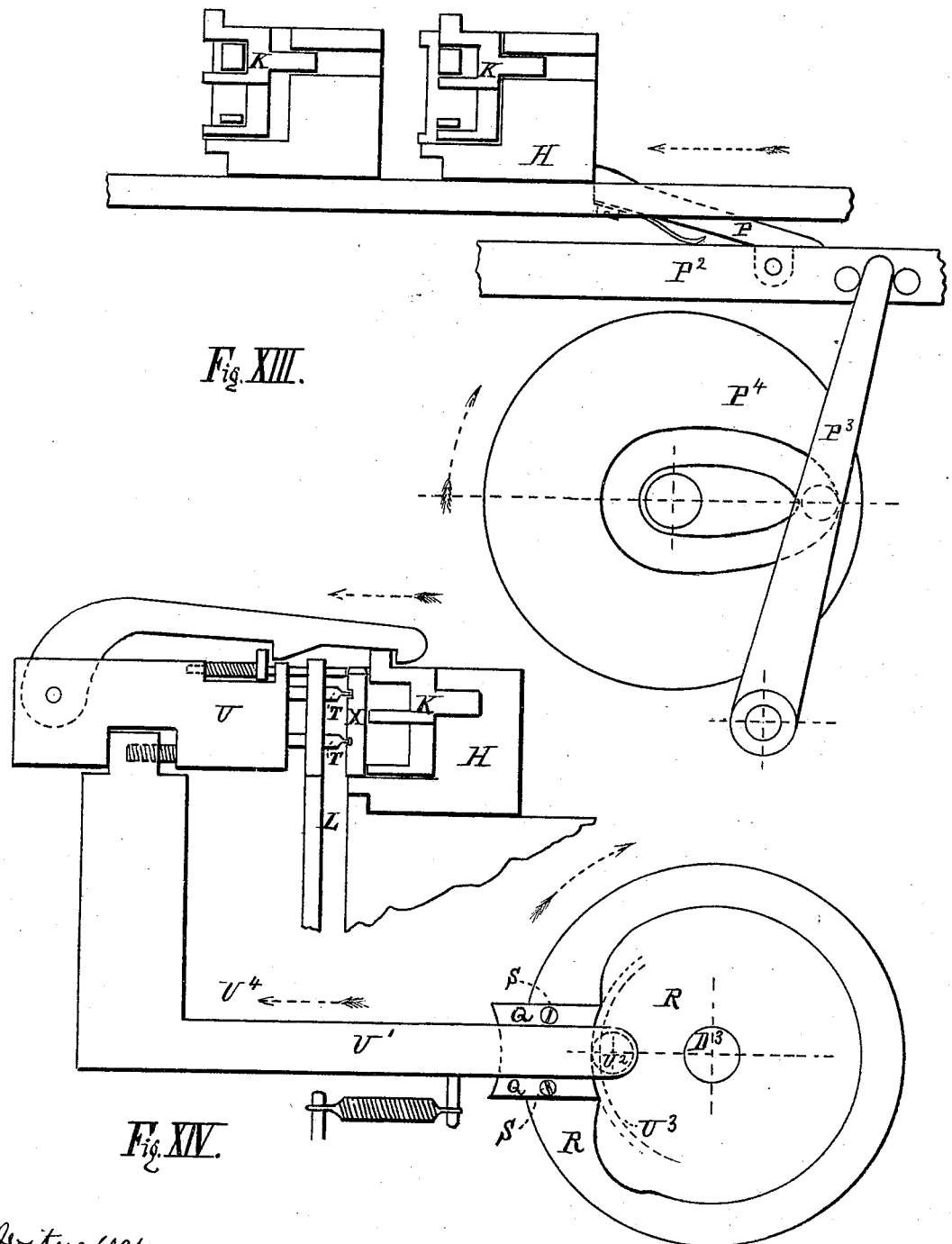

UNITED STATES PATENT OFFICE.

WILLIAM A. LORENZ, OF NEW YORK, ASSIGNOR TO SAMUEL W. GREEN, OF BROOKLYN, AND SAID GREEN ASSIGNOR TO EDWARD N. DICKERSON, OF NEW YORK, N. Y., TRUSTEE FOR HENRY A. BURR.

IMPROVEMENT IN TYPE-DISTRIBUTING MACHINES.

Specification forming part of Letters Patent No. 174,915, dated March 21, 1876; application filed August 9, 1875.

*To all whom it may concern:*

Be it known that I, WILLIAM A. LORENZ, of the city, county, and State of New York, have invented certain new and useful Improvements in Type-Distributing Machines, of which the following is a specification:

These improvements chiefly relate to a type-distributing machine invented by Charles W. Dickinson, for which applications were filed August 8, 1872, and July 22, 1875, and are modifications of the details of that machine.

In the accompanying drawings, which exhibit details, the entire machine invented by Dickinson is not shown, but only those parts which I have improved.

Figure 1 represents a front view of the horizontal galley with its adjustable side; also, a front view of the page-follower: also, a front view of the vertical line-elevating motion; also, a front view of the line-follower motion. Fig. 2 represents a top view of the galley with its adjustable side; also, a top view of the page-follower. Fig. 3 represents a side view of the type-driver for feeding the type to the carriers, and the adjustable lever mechanism for operating it, and its adjustable nose-piece; also, a side view of the adjustable cut-off spring; also, a side view of the feed-cap. Fig. 4 represents a top view of the type-driver; also, a top view of the adjustable cut-off spring; also, a top view of the line-follower and the adjustable friction for controlling its pressure; also, a top view of the nose-piece and the feed corner-piece; also, a top view of the line-opening finger and its controlling mechanism. Fig. 5 represents a side and top view of my improved type-carrier and clutch. Fig. 6 represents a side and top view of my improved type-carrier, clutch, and spring. Fig. 7 represents a side and top view of the carrier-clutch. Fig. 8 represents a side and top view of my improved ejector. Figs. 9, 10, 11, and 12 represent top views of the clutch-opening motion. Fig. 13 represents a side view of the apparatus for transferring the carriers from one row to the other. Fig. 14 represents a side view of the feeler-motion and its adjustable cam. Fig. 15 represents a top view of a type-case with slugs therein; and Fig. 16 represents a top view of the line-elevator cam and the line-follower cam.

A, Figs. 1 and 2, represents the horizontal galley of the distributer, upon which the type $A^1$ stands vertically, and B represents a side rail movable in the galley A, and adjustable to the width of the column of type $A^1$. This side rail B has one or more arms, $B^1$, attached to it, which arms extend through the galley side and can be clamped by set-screws $B^2$ at any position of adjustment, and thus securely hold the type to position. C represents a page-follower, sliding freely on a rod, $C^1$, which shoves forward the column or page of type $A^1$, by means of a weight, $C^2$, secured to it by a cord, $C^3$, running over a pulley, $C^4$, when the forward line of type $A^2$, Fig. 2, has been elevated, as at A, Fig. 1.

When the page of type $A^1$ under distribution has been shoved forward far enough to clear the rear part of the galley, a new page of type may be placed thereon, as at $A^4$, Fig. 2; and in the interval of time, while a line of type is being shoved endwise into the machine, the page-follower C may be swung up to the position $C^5$, slid back on the rod $C^1$, and lowered behind the new page $A^4$, which it will then shove forward, add to the column $A^1$, and feed the united pages forward, as before described, without stopping the machine.

$C^6$ represents the line-elevator, which is a vertically-moving plate arranged to elevate the line of type $A^3$ from the end of the page of type $A^1$. The distance that this plate travels vertically is at least the height of a type, and its motion is effected by means of a cam, $C^7$, through a supporting-rod, $C^8$, having an arm, $C^{10}$, which carries at one end a friction-roller, $C^{11}$, which rolls upon the surface of the cam. This cam $C^7$ comes into operation and revolves once by means of an automatically-tripped clutch mechanism, as in the machine of Dickinson, and its periphery from the point 10 to the point 30 raises the plate and with it the line of type, and when the cam stops the roller $C^{11}$ rests upon the high part of the cam, as in Fig. 1, and the plate remains stationary and supports the line of type until it is distributed. When the cam begins its movement, the plate is carried down positively by a groove, $C^9$, in the cam, in which the roller $C^{11}$ travels. This cam $C^7$ is shown in section in Fig. 16, which is taken at the line $a\,b$ of Fig. 1. The roller $C^{11}$ is forced down the groove $C^9$ both by the weight of the elevator, to which it is attached, and by the direction of the groove. This movement of it may be assisted by a weight, 15, if desired.

A cam, $C^{13}$, controls the movement of the line-follower $C^{14}$ by means of the lever $C^{15}$. A portion, $C^{12}$, of this cam $C^{13}$, is cut with an easy grade or incline, upon which the line-follower lever $C^{15}$ bears as it is forced forward by the weight 5, so as to cause the line-follower to be returned gently as the cam $C^{13}$ revolves until the follower is arrested by the line of type $A^3$; and this gentle return movement prevents the line-follower $C^{14}$ from injuring the feed-motion, if for any reason a line of type fails to rise from the galley and the follower returns unobstructed. This cam $C^{13}$ is shown in section in Fig. 16, in which its relative position to $C^7$ is also exhibited.

The type-driver D is reciprocated by a bell-crank, $D^1$, pivoted on a stud, $D^9$, and actuated by a cam, $D^2$, on the main shaft $D^3$, which bell-crank is held in contact with the cam by a spring, $D^4$. The drawing, Fig. 3, represents the bell-crank $D^1$ as having driven in the type-driver D toward the type-carrier H, and deposited a type, X, therein. In doing this a roller, $D^7$, attached to one arm, 20, of the bell-crank $D^1$, is represented as wedged in between the two jaws $D^6$ and $D^8$, of which $D^6$ is inclined. On the return stroke of the bell-crank $D^1$ in the direction of the arrow $D^{10}$, its arm 20 carries the type-driver D in the direction of the arrow $D^5$. In so doing the roller $D^7$ sinks below the position shown in the drawing, moving in the arc of a circle shown by the dotted line 22. As a consequence, it no longer is wedged between the jaws, as shown in the drawing, and may be moved forward away from the jaw $D^8$ without, at the same time, touching the other. Two effects are produced by this arrangement; one of which is, that when the slide is carried backward in the direction of the arrow $D^5$, and has compressed the spring F, as will be hereafter described, the roller, in returning toward the position shown in the drawing, does not at first carry the slide along with it, but leaves the spring F to act whenever the type in the line has been pushed out far enough to pass the corner $I^2$, Fig. 4; and the other is, that as the type-driver D, Fig. 3, is carried forward by the action of the roller upon the inclined jaw $D^6$, the slide is arrested in its movement by the contact of the jaw $D^8$ with the roller, just when the type-driver D has been thrown far enough to lodge the type in the carrier without pressing or bruising it. One arm, 20, of the bell-crank $D^1$ is adjustable upon the other, 21, to compensate for any lost motion occasioned by the wear of the cam $D^2$.

G, Fig. 3, represents a feed-cap attached to the finger $G^1$, which finger swings on its pivot $G^2$, attached to the type-driver D. The under surface of this cap is a little higher than the face of the line of types as they are pushed out against the finger under the cap; but the ledge $I^4$, Fig. 4, of the corner-piece I, on which the base of the type slides as it is pushed forward toward the carrier, is slightly inclined upward, as seen in Fig. 3, so that when the type reaches the carrier its face is almost in contact with the lower side of the cap, and any tendency to spring up is counteracted, and consequently the type is left fairly on its seat in the carrier, and is there held by the clutch before the cap is withdrawn, thereby securing perfect uniformity in the relative position of the nicks in the type without any abrasion or bruising upon their faces. The cap being a little higher than the type, in its return motion with the finger, passes over the end of the line of type without touching it.

F, Figs. 3 and 4, represents an adjustable spring acting against the type-driver D in the direction of the arrow $D^{11}$. This spring F is mounted upon a stem, $F^2$, one end of which is screwed through a stationary block, 25, and can thus be advanced or withdrawn, so as to compress or relax the spring more or less, as desired. $F^6$ is a thumb-nut pinned fast to the stem $F^2$, by which it may be screwed in or out through the stationary block, which has a female screw cut in it. $F^1$ is a jam-nut for securing it in position when adjusted. The spring is compressed between the thumb-nut $F^6$ and a sliding collar, $F^4$, which bears against a part, 26, of the frame. When the type-driver D is withdrawn it comes into contact with the collar $F^4$ and presses the spring F, which, by yielding, permits the type-driver D to be withdrawn to its full throw, and which reacts upon the type-driver in proportion to the tension with which it has been set or adjusted. This capacity for regulating the spring-pressure which operates upon the type-driver D is important, in view of the fact that different type vary in their freedom from adhesion to each other, as they have been used for different purposes, some having wax upon them, some ink, some plaster, some oil, and some being quite free from either; and that it is desirable not to subject the type to any greater amount of force than is necessary to overcome their adhesion to each other, and so not to bruise or injure them.

E, Fig. 4, represents an adjustable nose-piece attached to the type-driver D by means of its slot 8 and a nut, $E^1$. This nose-piece is subjected to a great deal of wear in driving the type into the carriers; and it is necessary that its position should be very accurately fixed, so that it will drive the type no farther than required; and as the machine may use type of different widths it is necessary also to have this nose-piece adjustable, so as to reach farther when the type are narrower than it does with wider type. Therefore, this nose-piece is made independent of the type-driver D, and adjustable upon it, so that it can be hardened, easily replaced if worn or broken, and adjusted to its exact position. This nose-piece E may be made alike at its opposite ends, so that when one end may be worn away, the other may be used.

I, Fig. 4, represents an adjustable corner-piece, at which the separate type X are cut off from the line of type $A^3$. Both the nose-piece E and the corner-piece I are made of metal, preferably of steel, and both may be hardened. $E^3$ represents a bevel or rounding of the nose-piece E, and $I^2$ represents a bevel or rounding of the corner-piece I, which beveling insures a more perfect cutting off of the type X, and prevents the abrasion either of the type X on the corner-piece I or of the next type in the line by the nose-piece E. $I^3$ represents an angle or recess in that part of the corner-piece I nearest the type-carrier H, in which recess the type is caught when it is fed into the carrier H, as seen at $X^1$, thus preventing the type from being withdrawn by the return motion of the type-driver D.

$G^3$, Fig. 4, represents a roller in the cut-off lever $G^4$, against which the line-opening finger $G^1$ bears. This roller insures a smooth and easy forward motion of the finger $G^1$ as each separate type X is cut off.

$F^3$, Fig. 4, represents an adjustable friction-spring, acting on the side of the pulley $F^7$, over which the line-follower cord $F^5$, attached to the line-follower $C^{14}$, runs. This adjustable friction governs the power applied to the line-follower, to suit the condition of the type, and enables it to run waxy, inky, or in any way dirty type.

Fig. 5 represents two views of a type-carrier, H, in which is swung a solid metal clutch, J, on a pivot, $J^1$. This clutch is shown in two views separately in Fig. 7, and in place in Figs. 5 and 6. It vibrates in the carrier H with a spring, $J^2$, pressing on it. This clutch J will hold any thickness of type that may be placed underneath it in the recess in the front of the carrier H. It can be pressed open in the carrier H through an opening, $J^3$, in the carrier, which may then receive a type.

Fig. 8 represents a side and front view of a sliding ejector, K, that lies in the cored-out channels of the carrier H, as may be seen in Fig. 13, Sheet 5. This ejector K has three arms, as in Fig. 14, which, when drawn forward in the carrier H, close the open side of the recess or way in the front plate which leads into the conductor L, and prevent the type from falling back into the carrier H. By making two or more arms as full as the depth of the cored out portion of the carrier will allow, the said recess is yet more effectually closed. This extra width of the ejector K can be seen at $K^1$, Fig. 8, Sheet 3.

Figs. 9, 10, 11, and 12, Sheet 4, represent four views of the process of depositing a type into the hold of a type-carrier clutch. M represents the plunger for moving the carrier H in the direction of the arrow N. J represents the clutches in the carriers. $J^2$ represents the springs acting on the clutches J. X represents the single type to be deposited in the carrier H. D represents the type-driver, and $G^1$ the finger. O represents an adjustable stud projecting from the face of the plunger M. The action of depositing the type in the carrier is as follows: The type X, Fig. 9, having been cut off from the line, is ready to be deposited in the carrier. When the carrier H H has been brought forward into the position shown in Fig. 9, the plunger M moves the type-carriers H in the direction of the arrow N, and brings them to the position shown in Fig. 10. In this movement the stud O passes through the opening $J^3$ of the carrier H H, and opens its clutch J to the position shown in Fig. 10. Fig. 11 represents the type X as having been moved forward by the type-driver D and deposited in the carrier H H. Fig. 12 shows the plunger M retreating in the direction of the arrow $N^1$. In this retreating movement the stud O has been withdrawn, and the clutch J has caught the type X by the spring $J^2$ pressing on it. After this has been accomplished the type-driver D retreats in the direction of the arrow $N^2$, and the operation is repeated.

Fig. 13 represents a side view of the pawl P on the sliding carrier-driver $P^2$, which engages with the bottom of the carrier H, as the pawl is moved by the lever and cam motion $P^3$ $P^4$, in throwing the carriers at either end of the distributer from the rear line to the front line of the carriers, or vice versa. $P^4$ is a grooved cam, which revolves in the direction of the arrow. The lever $P^3$ is vibrated by means of a roller which travels in the groove, and the driver $P^2$ is reciprocated by the upper end of the lever $P^3$, carrying with it the pawl P, which rises behind the carrier H, when it is withdrawn into the position shown in the drawing, and which moves the carriers H forward into the front line, or vice versa, and then returns to the position shown in the drawing, the pawl P being depressed under the carrier, and rising again by the force of the spring which supports it. By this arrangement the pawl may be made to bear upon a larger part of the surface of the carrier, and thus reduce any tendency to bruise it.

Fig. 14 represents a part, Q, of the feeler-cam R on the main shaft $D^3$, which may be adjusted by reversing or by sliding it, and secured to the cam R by screws S. This adjustable part Q of the cam R regulates the depth to which the feelers T T feel by means of the connecting slides U and $U^1$ and roller $U^2$. In order to feel deeper into the type X, or in order to feel a narrower width of type at X, the adjustable part Q may be slid farther into the cam, or it may be reversed, thus controlling the motion of the roller $U^2$ to a desired position, as is shown at $U^3$. It is apparent that while a variable feeling depth can thus be secured, the outward motion of the slide U in the direction of the arrow $U^4$ will be alike at every revolution of the cam R.

Fig. 15 represents a type-case, V, with channels V¹. W represents spring friction-slugs in the channels V¹, holding the types X in position in the channels, while Z represents free sliding slugs between the friction-slugs W and the line of types X. This arrangement of slugs obviates the necessity of changing the slugs in the type-channels, either for the composing-machine or the distributing-machine, for it is obvious that when the type-case is horizontal or partially inclined, as in the distributer, the type cannot fall down by reason of the spring-slugs holding them, and when the type-case is vertical, as in the type-composer, the free slug slides down with the line of types as they are fed out the bottom.

What I claim as my invention is—

1. In combination with a galley, a follower for pushing in the column of type to be distributed, mounted upon a rod, on which it slides in the direction of the motion of the type-column, and around which it can be vibrated, so as to permit the addition of more type to the column without stopping the machine, substantially as described.

2. The combination of the revolving cam for operating the slide which feeds in the type from the line of the carrier with the bell-crank and the diverging jaws on the slide, substantially as and for the purpose described.

3. The cap G, in combination with the feeding-in slide, and moving therewith, for the purpose of preventing the type from rising in the carrier, constructed and arranged substantially as described.

4. The combination of an adjustable spring with the feeding-in slide for the purpose of giving its first impulse, substantially as and for the purpose described.

5. An adjustable friction-pulley, over which the cord operating the line-follower passes, in combination with the line-follower, for the purpose of regulating the force with which the weight drives the line-follower, substantially as described.

6. An adjustable nose-piece, E, in combination with the feeding-in slide D, substantially as and for the purpose described.

7. A corner-piece, opposite the carrier which is receiving a type, having a recess cut therein for the purpose of holding the type from being withdrawn, in combination with the type-driver and carrier, substantially as described.

8. The nose-piece E and the corner-piece 1, constructed with rounded corners, substantially as described.

9. The roller on the cut-off lever G⁴, in combination with the line-opening finger, for the purpose described.

10. In combination with the type-carrier, the ejector with three prongs, of which two are of full width, constructed and operated as described.

11. The combination of the vibrating spring-clutch of the carriers with the opening projecting stud O on the follower M, which moves the line of carriers, so arranged as to open the clutch for the reception of the type, and to hold it open until the type has been admitted, substantially as described.

12. In combination with the feeler-slides, the adjustable and reversible section of the cam R, for the purpose of varying the movement of the following apparatus as different kinds of type are used, substantially as described.

13. In the case V for receiving the type from the distributer, the combination of a spring slug with with a free slug, for the purpose and operated in the manner described.

WILLIAM A. LORENZ.

Witnesses:
JOHN MCCRONE,
GEO. H. EVANS.